United States Patent [19]

Means, Jr.

[11] Patent Number: 5,143,529
[45] Date of Patent: Sep. 1, 1992

[54] FILTER CLEANING APPARATUS

[76] Inventor: Orville D. Means, Jr., 25570 Highway 79, San Ysabel, Calif. 92070

[21] Appl. No.: 626,738

[22] Filed: Dec. 13, 1990

[51] Int. Cl.⁵ .............................................. B01D 46/38
[52] U.S. Cl. .................................... 55/290; 55/294; 55/291; 55/300; 55/302; 134/22.12
[58] Field of Search ................. 55/290, 291, 294, 300, 55/302; 134/21, 22.12, 22.18, 33, 24

[56] References Cited

U.S. PATENT DOCUMENTS

| | | | |
|---|---|---|---|
| 2,516,680 | 7/1950 | Culpepper | 55/294 |
| 4,704,144 | 11/1987 | LeBlanc et al. | 55/300 |
| 4,808,234 | 2/1989 | McKay et al. | 134/21 |
| 4,842,624 | 6/1989 | Barton | 55/291 |

Primary Examiner—Bernard Nozick
Attorney, Agent, or Firm—Baker, Maxham, Jester & Meador

[57] ABSTRACT

A filter cleaning apparatus for cleaning cylindrical filters comprises a support frame, a mounting clamp on the support frame for supporting a filter in a vertical orientation, inner and outer air nozzles mounted for vertical movement along the inner and outer surfaces of a filter for directing an air jet against the respective surface for dislodging debris therefrom, and inner and outer vacuum nozzles mounted adjacent to and moveable with the air nozzles for drawing in debris dislodged by the air jets.

20 Claims, 3 Drawing Sheets

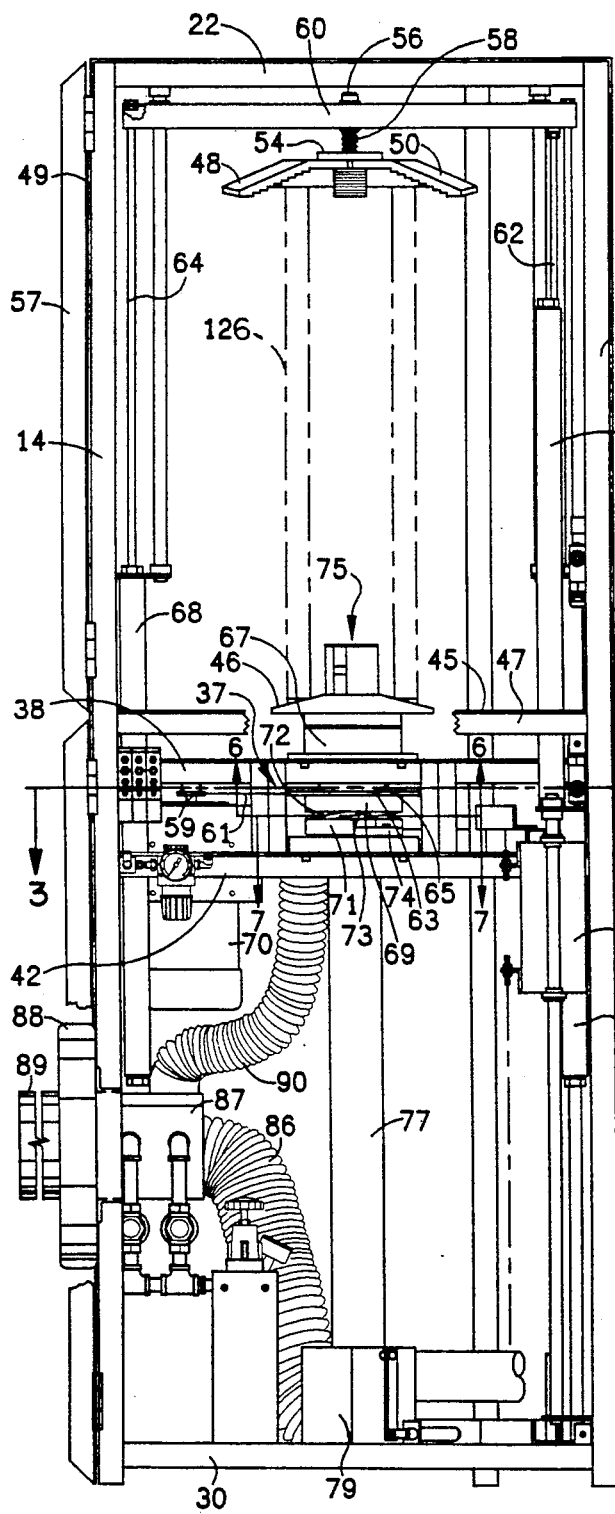
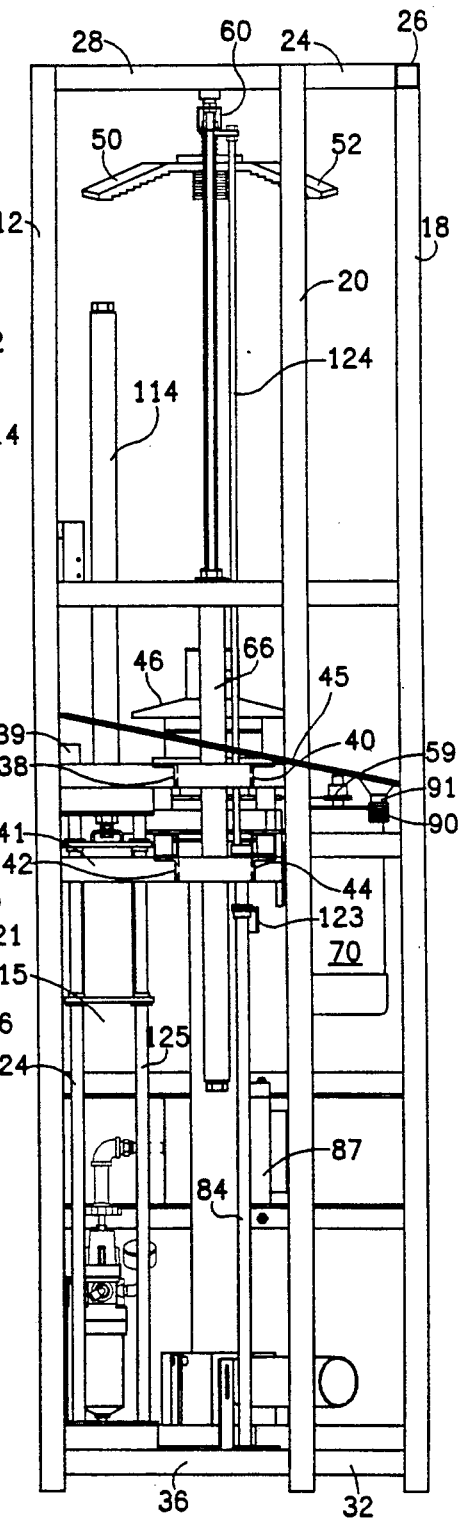
FIG. 1
FIG. 2

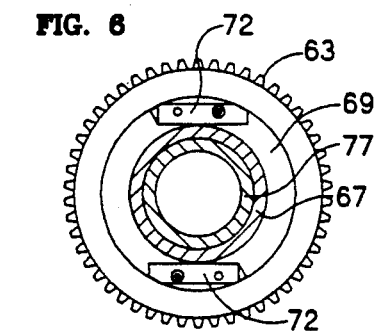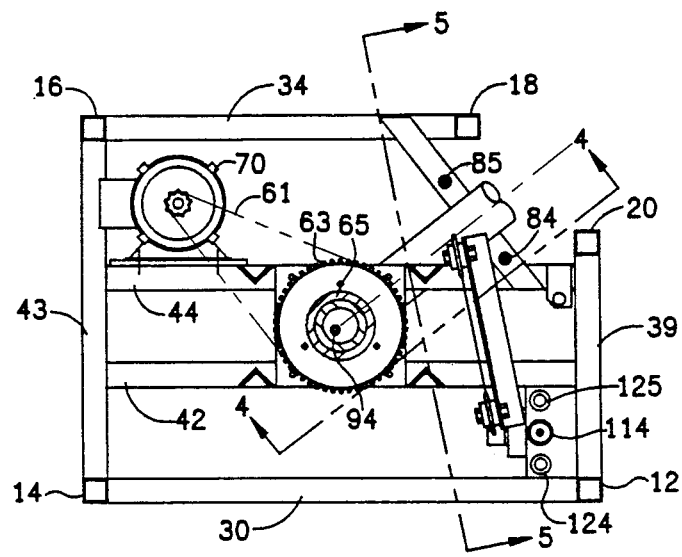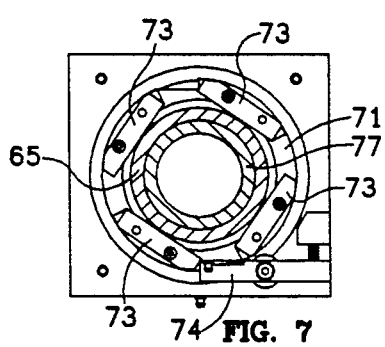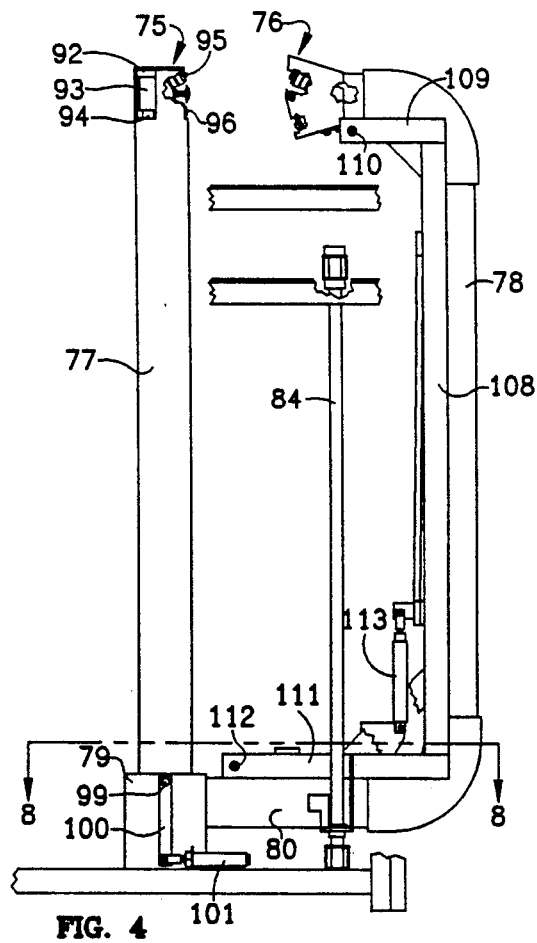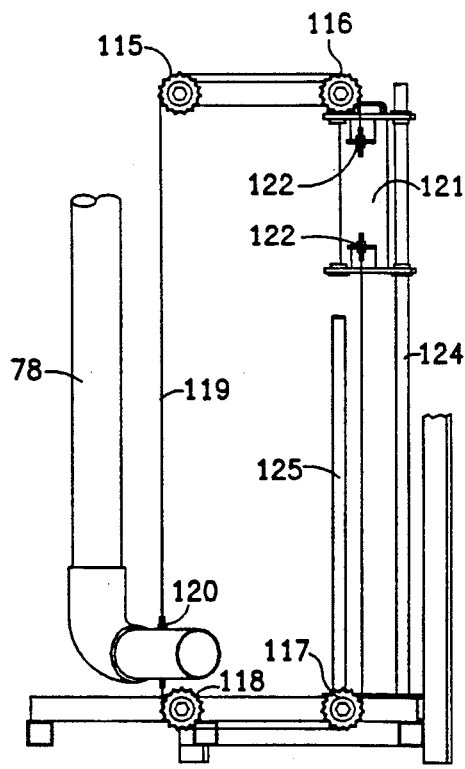

FILTER CLEANING APPARATUS

BACKGROUND OF THE INVENTION

The present invention relates to cleaning apparatus and pertains particularly to an improved filter cleaning apparatus.

Internal combustion engines, gas turbines, and other air breathing machines are subject to damage from dirt, grit and the like that gets into the air that they breathe. Therefore, they must have source of air that is clean and free of grit and debris. Most such machines utilize filters to filter grit and other debris from the air drawn into the machinery. Most such filters currently in use are of a large cylindrical tubular configuration, with some being tapered somewhat.

The filters are typically formed of inner and outer wire mesh or perforated metal screens, with a corrugated paper filter therebetween. The filter paper is formed to allow the passage of air but to trap fine dirt and grit particles. The filter paper is typically corrugated in order to provide a large surface area for the passage of air and entrapment of dirt and grit particles. These filters typically cost between thirty-five and eighty-five dollars each. Therefore, filter replacement can become quite expensive when operating in dirty and dusty environments, such as mining and other earth working environments.

It has been customary in the past to clean the filters by washing them in a solvent or the like. The filters can be typically cleaned two to three times before they are discarded. It is desirable that other methods or apparatus be available to clean filters and extend the life thereof.

SUMMARY AND OBJECTS OF THE INVENTION

It is the primary object of the present invention to provide an improved filter cleaning apparatus.

In accordance with a primary aspect of the present invention, a filter cleaning apparatus for cleaning cylindrical filters comprises means for supporting a filter in a vertical orientation, air nozzle means mounted for vertical movement along the surface of a filter for directing an air jet against a filter surface for dislodging debris therefrom, and vacuum nozzle means mounted adjacent to and moveable with said air jet means for drawing in debris dislodged by said air nozzle.

BRIEF DESCRIPTION OF THE DRAWING

The above and other objects and advantages of the present invention will become apparent from the following description when read in conjunction with the accompanying drawings wherein:

FIG. 1 is a front elevation view of a preferred embodiment of the invention;

FIG. 2 is a right side elevation view of the embodiment of FIG. 1;

FIG. 3 is a fragmented partial sectional view taken generally on line 3—3 of FIG. 1;

FIG. 4 is a fragmented partial sectional view taken generally on line 4—4 of FIG. 3;

FIG. 5 is a fragmented partial sectional view taken generally on line 5—5 of FIG. 3;

FIG. 6 is a sectional view taken on line 6—6 of FIG. 1;

FIG. 7 is a sectional view taken on line 7—7 of FIG. 1;

DETAILED DESCRIPTION OF A PREFERRED EMBODIMENT

Figures 8, 9:
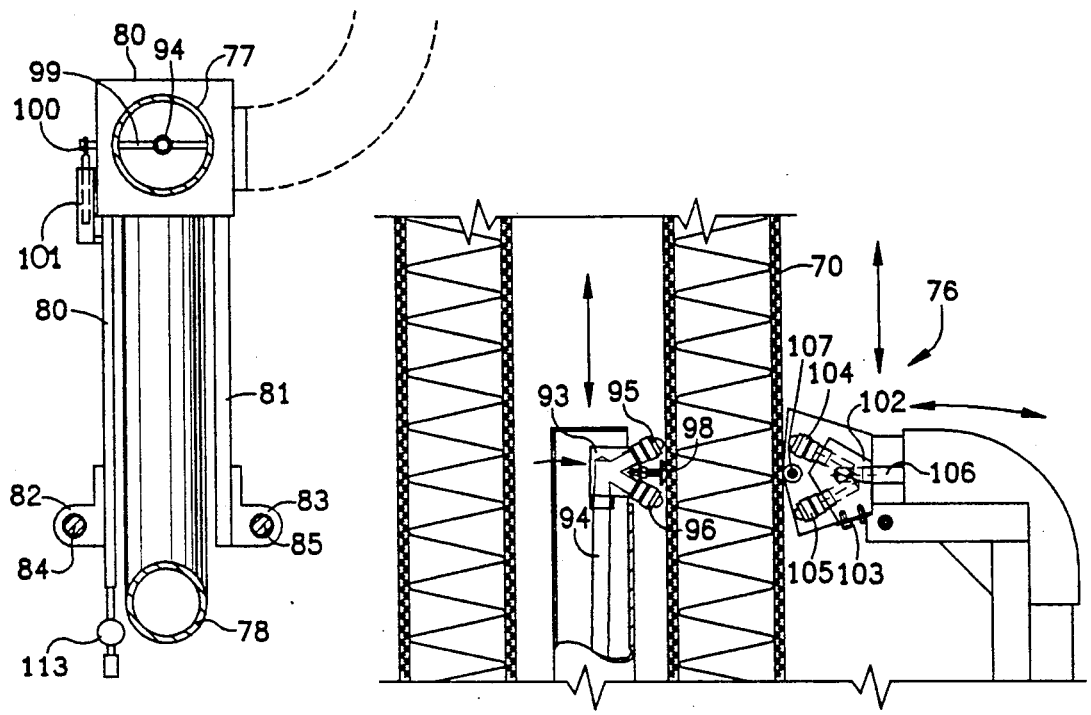
FIG. 8 is a sectional view taken on line 8—8 of FIG. 1.
FIG. 9 is an enlarged detail view showing details of the cleaning heads in contact with a filter.

Referring to FIGS. 1-3 of the drawings, an exemplary embodiment of the invention is illustrated and designated generally by the numeral 10. The illustrated embodiment comprises a generally vertically extending support frame structure of a somewhat generally rectangular box-like construction. One corner of the frame is cut off or eliminated, as shown in FIG. 3, to accommodate an outer vertically moveable vacuum tube as will be explained. The frame comprises three vertically extending corner frame members 12, 14 and 16 and two end frame members 18 and 20 of suitable structure, such as tubular square stock connected together at the top by top horizontal frame members 22, 24, 26 and 28 and at the bottom by bottom horizontally extending frame members 30, 32, 34 and 36 of similar stock.

A central support platform or frame is disclosed as being substantially midpoint of the height of the frame assembly. This central support comprises upper cross support beam members 38 and 40 and lower cross support beam members 42 and 44, onto which is mounted a drive hub assembly, designated generally at 37. These extend and are secured between a pair of side frame members 39 and 41 secured between vertical members 12 and 20, as seen in FIG. 2, and a pair of side frame members, only one shown at 43, extending and secured between vehicle frame members 14 and 16 (FIG. 3). A thin sheet metal plate 45 may be secured on the top of a frame member 47 between frame members 12 and 14 to form the bottom of a cross frame member (not shown) between members 16 and 18, a box-like enclosure defined by a pair of side panels 49 and 51, a top panel 53, a back panel 55 and an openable or pivoting (transparent) front door panel 57. This forms an enclosed chamber in which means for mounting a filter to be cleaned is disposed.

Mounting means for mounting a filter within the enclosed chamber for cleaning comprises a lower conical clamp member 46 and an upper finger clamp member. The lower clamp member comprises a rotatable drive and support member 46 for engaging a lower end of a filter, and the upper clamp member comprises radial arms 48, 50 and 52 extending outward from a central hub 54 for engaging the upper end of a filter. The central hub 54 is mounted on a shaft 56 and spring biased by a compression spring 58 downward into or toward the upper end of a filter. The upper clamp member is mounted on a crossbar or member 60, which is supported for vertical reciprocation between a pair of laterally spaced rods 62 and 64, which are vertically oriented and operated by a pair of air cylinders 66 and 68 extending upward from below the support table. The arms 48, 50 and 52 of the upper support or clamp member extend downward and include stepped surfaces for centering a tubular filter thereon. The lower rotatable support member is conical shaped to aid in centering filters. These clamp members form vertically spaced clamp surfaces for engaging and clamping a vertically oriented, generally tubular filter 125 in position (as shown in phantom and in section).

The machine includes means for rotating and vibrating or jolting the filter while it is being cleaned by the air jet and vacuum nozzles. The drive means includes, for example, a reversible electric motor 70 drivingly connected through a drive sprocket 59 and chain 61 to a driven sprocket 63 on a central drive hub assembly, designated generally at 37, connected via a hollow shaft to the lower conical clamp member 46. The lower conical clamp member 46 has an upper tapered or conical circular clamp surface for engaging the lower end of a filter. The clamp member 46 is drivingly connected by a downward extending hollow shaft 65 (FIG. 3) mounted in a bearing 67 and driven by the motor 70 by the aforementioned drive train.

The drive assembly, as best seen in FIGS. 6 and 7, includes a jolting or jarring mechanism in a form of a pair of opposed tooth discs 69 and 71, one of which 69 is driven by way of the driven sprocket 63 from the motor 70. A series of opposed ramp type one-way clutch teeth 72 and 73 are disposed between the upper rotating disc 69 and the lower disc member 71. The disc 71 is rotatable with disc 69 in the clockwise direction, but is prevented from rotating counter clockwise by a dog 74. This arrangement provides both rotation of a filter in the clockwise direction and combined rotation and vibrating or jolting means when driven in the counter clockwise direction. Rotation of the drive disc 69 in a clockwise direction results in the rotation of the filter clamp assembly at a predetermined or selected rate of rotation. A preferred rate of rotation has been found to be about 60 to 120 RPM.

Rotation of the drive means in the counter clockwise direction results in camming the upper toothed disc 69, the drive shaft 65 and the lower clamp 46 upward and allowing it to drop intermittently for shaking, impacting or vibrating the filter for knocking loose debris and the like therefrom. The preferred rate of rotation during the jolting is in a range of about 100 to 200 RPM. Thus, the drive means is operable in one direction for the smooth rotation of the filter and operable in the opposite direction for shaking or vibrating the filter.

Cleaning means for the filter comprises inner and outer cleaning heads, designated generally at 75 and 76 (FIG. 4), each of which comprises a combination of an air jet and a vacuum nozzle. These cleaning heads are disposed on the upper ends of a pair of vacuum tubes 77 and 78. The tube 77 is mounted to reciprocate vertically within the bore of the hollow tubular shaft 65 as it reciprocates within the bore of a filter being cleaned. The tubes 77 and 78 are both connected at the lower end to a common plenum 79, which is mounted on or a part of a vertically reciprocable carriage comprising a pair of parallel frame members 80 and 81, which extend to each side of a lower horizontal leg of vacuum tube 78. The carriage 80, 81 is mounted by means of a pair of bearing members 82 and 83 on a pair of vertical rods 84 and 85 for vertical reciprocation.

The vacuum tubes 77 and 78 are connected via plenum 79, a flexible hose 86 and a valve unit 87 to a vacuum pump 88 driven by a motor 89. A vacuum line 90 also connects the vacuum pump to the upper or cleaning chamber by a vacuum port 91 (FIG. 2) for drawing dust and debris therefrom.

In a preferred form, as shown in FIGS. 4 and 9, the air jet is positioned internally of the vacuum nozzle which surrounds the jet to pick up debris loosened by the air jet. The cleaning heads 75 and 76 move vertically with the inner cleaning head 75 moving inside the bore of a filter as the outer cleaning head 76 moves along the outer surface of the filter. The vacuum nozzle of cleaning head 75 comprises one or more openings 92 in the upper end of the inner vacuum tube 77. The air nozzle comprises a head 93 mounted on the upper end of a pivotally mounted pipe or tube 94 and having a pair of air nozzles 95 and 96 extending outwardly therefrom. The head 93 is extendable and retractable through an opening 97 in tube 77, and includes an adjustable shoe 98 for engaging the inner surface of a filter, as shown in phantom in FIG. 9.

The head 93 is mounted on the upper end of pipe 94, which is pivotally mounted at the bottom thereof on a shaft 99 in the box 79. An arm 100 attached to shaft 99 and actuated by an air cylinder 101 acts to pivot the pipe 94 and head 93 to a retracted position within tube 77, and to extend it to an active position into engagement with a filter surface (FIG. 9).

The outer cleaning head 76 includes an air nozzle head 102 within and surrounded by a bonnet-like hood 103 communicating with the interior of the vacuum tube 78. A pair of air nozzles 104 and 105 extend outward from the head 102, and are supplied with high velocity air via a line 106 from a source. A roller engages the surface of a filter and supports the cleaning head in close proximity thereto. The head 76 and tube 78 are pivotal toward and away from the filter by means of a linkage mechanism comprising a pair of links 108 (only one shown), with an upper arm 109 pivotally connected at 110 to the head 76. A lower and longer arm 111 is pivotally connected at 112 to the carriage 80. An air cylinder 113 connected between the carriage 80 and the link 108 pivots link 108 about pin 112 to pivot head 76 inward toward the filter. The different lengths of arms 109 and 111 causes head 76 to move inwardly and upwardly to tuck under the clamp arms 48–52.

The system is designed to clean tubular type filters which may be either substantially cylindrical or frusto-conical. The heads 75 and 76 move together along the inner and outer surfaces of a tubular filter as shown in FIG. 9. The air jets or nozzles of the cleaning heads are connected to a suitable high pressure air system, such as an air compressor, and the vacuum nozzles are connected to the vacuum system via flexible line or hose 86 to the vacuum pump 88. The cleaning heads move together with the common carriage 80, 81 in the illustrated embodiment.

The inner air cleaning head 75 in its illustrated embodiment comprises a tubular member which extends upward through the center of the drive assembly, such that the head moves vertically within the inside of the filter as the filter vibrates, rotates or is stationary. The outer cleaning head 76 is mounted to be carried by the vertically movable carriage 80, 81, and moves with the head along adjacent the outer surface of the filter body. Thus, the cleaning heads move together simultaneously along the inner and outer surfaces of the filter on the common carriage.

The carriage 80, 81 carrying the cleaning heads 75 and 76 is mounted on a pair of vertical support rods 84 and 85 for vertical reciprocal movement within the support frame. The carriage is driven by a suitable power means and linear motor, such as an air or hydraulic motor 114 connected through a chain drive. The chain drive comprises four chain sprockets 115, 116, 117 and 118 rotatably mounted to the frame, and a chain 119 connected to the carriage at 120 and to a counterweight 121 at 122. The counterweight 121 is mounted for vertical reciprocation on a pair of vertical guide rods 123 and 124. The counterweight 121 counters or balances the weight of the carriage and the cleaning head assemblies. The upper limit of movement of the carriage is determined by the position of the upper clamp jaw 54, which is determined by the height of a filter clamped therein. The upper limit is set by a limit switch actuator 125 (FIG. 2) slideably mounted on rod 48, and positioned by a rod 126 connected thereto at a lower end and to cross beam 60 at the upper end.

Figure 10:
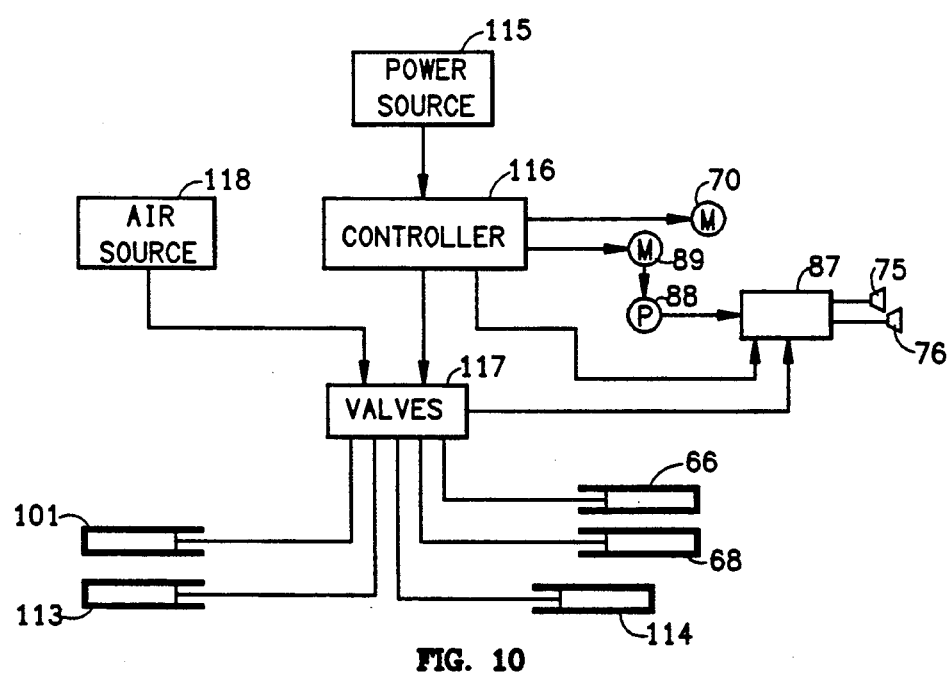
FIG. 10 is a functional block diagram of a control system for the apparatus of FIG. 1.

The system preferably has a control system enabling it to be controlled for a selected sequence of operations. For example, it may be programmed to go through a sequence of cleaning maneuvers, such as an initial shaking of the filter, followed by a cleaning step wherein the cleaning heads move vertically in a continuously reciprocating manner while the filter rotates at a selected speed for a predetermined period of time. A suitable schematic illustration of a suitable control circuit is shown in FIG. 10, and comprises a source of power 115, such as A.C. or D.C. electrical power supplies power via suitable conductors to a controller 116 to power electric motors 70 and 89 and operate a system of valves 117. The controller 116 may be any suitable device, such as a CPU or a timer controlled switch system. It may be set to operate various switches and valves for operation of the various motors of the system. A system of valves 117 operated by the controller functions to control air from a source 118 to the air nozzles of the cleaning heads and to the various air motors that operate the various components of the system.

The present system has been found to be effective to clean filters without damage thereto. I have conducted research and fount that the typical filter can be cleaned between twenty and thirty times without damage. This is in contrast to the usual method of solvent cleaning wherein the filter may last for only about two to three cleanings. This invention results in a considerable savings in both labor and construction of filters versus the prior art approach.

In operation, a filter to be cleaned is selected and positioned on top of the lower filter support 46 in a vertical orientation and the machine activated. This results in the activation of the clamp cylinders 66 and 68 pulling the upper clamp member 48, 50 and 52 into engagement with the upper end of the filter clamping head into position within the chamber. A preferred cleaning cycle is about three minutes. In a preferred sequence, the drive motor 70 is activated for rotating and activating the shaking or vibrating mechanism for vertically vibrating the filter unit for a predetermined period of about twenty seconds. The vacuum nozzles of cleaning heads 75 and 76 are activated at about the same time as they move up along and in contact with the filter. The drive motor is then reversed to rotate the filter without vibration as the nozzles are activated to both blow high velocity air as well as vacuum as they reciprocate along the surfaces of the filter.

As an alternate procedure after a predetermined shaking, the filter may then be rotated at a predetermined rate as the cleaning heads reciprocate along the length thereof. The combined rotation of the filter and reciprocation of the heads traces the heads over the surface of the filter, thus with a predetermined programmed path and rotation of the entire surface of the filter is covered by the cleaning heads. The filter can be cleaned by this process in about three minutes. As soon as the cleaning cycle is completed, the machine is deactivated and the door to the chamber opened and the clamping mechanism released. The filter may then be lifted out of the machine ready for reuse in a vehicle or the like.

While the present invention was developed for cleaning generally tubular, including somewhat conical filters, I have discovered that with minor modifications I can also clean non-tubular filters. For example, certain filters exist which have a generally V-trough configuration. These, and others having either a curved (i.e. semicircular) or flat planar configuration can be cleaned by slight modifications to the clamps and limiting the rotation of the filter clamp or support to an oscillation. The filters can be mounted in the machine and moved so that the cleaning heads move along the opposed faces thereof while cleaning.

While I have illustrated and described my invention by means of specific embodiments, it should be understood that numerous changes and modifications may be made therein without departing from the spirit and scope of the invention as defined in the appended claims. I further assert and sincerely believe that the above specification contains a written description of the invention and the manner and process of making and using it, in such full, clear, concise, and exact terms as to enable any person skilled in the art to which it pertains, or with which it is most nearly concerned, to make and use the same, and further that it sets forth the best mode contemplated by me for carrying out the invention.

I claim:

1. A filter cleaning apparatus for cleaning generally tubular filters, comprising:
   a support frame;
   mounting means mounted on said support frame for supporting a generally tubular filter having an axis for rotation about said axis;
   air nozzle means mounted for vertical movement along a surface of a generally tubular filter supported in said mounting means for directing an air jet against said filter surface for dislodging debris therefrom; and
   vacuum nozzle means mounted adjacent to and moveable with said air jet means for drawing in debris dislodged by said air nozzle.

2. A filter cleaning apparatus for cleaning cylindrical filters, comprising:
   a support frame;
   mounting means mounted on said support frame for supporting a cylindrical filter in a vertical orientation;
   air nozzle means mounted for vertical movement along the surface of a filter supported in said mounting means for directing an air jet against a filter surface for dislodging debris therefrom;
   vacuum nozzle means mounted adjacent to and moveable with said air jet means for drawing in debris dislodged by said air nozzle; and
   means for rotating said filter.

3. A filter cleaning apparatus for cleaning cylindrical filters, comprising:
   a support frame;
   mounting means mounted on said support frame for supporting a cylindrical filter in a vertical orientation;
   air nozzle means mounted for vertical movement along the surface of a filter supported in said mounting means for directing an air jet against a filter surface for dislodging debris therefrom;

vacuum nozzle means mounted adjacent to and moveable with said air jet means for drawing in debris dislodged by said air nozzle; and means for jolting said filter to aid in dislodging debris therefrom.

4. A filter cleaning apparatus according to claim 1 wherein said mounting means comprises a vertically oriented clamp having a generally conical lower jaw and a spring mounted upper jaw for supporting a filter in a vertical orientation.

5. A filter cleaning apparatus according to claim 4 further comprises means for rotating said filter by rotating said lower jaw.

6. A filter cleaning apparatus according to claim 1 further comprising means for jolting said filter comprising cooperative ramp means for intermittently raising and dropping said mounting means during rotation thereof.

7. A filter cleaning apparatus according to claim 1 wherein:

said air nozzle means is mounted within and surrounded by said vacuum nozzle means and operable simultaneously therewith for directing an air jet against a filter surface for dislodging debris therefrom while said vacuum nozzle means is drawing in debris dislodged by said air nozzle.

8. A filter cleaning apparatus according to claim 7 wherein said air nozzle means and said vacuum nozzle means comprises an inner nozzle assembly for moving along an inner surface of a filter and an outer nozzle assembly for moving along an outer surface of a filter.

9. A filter cleaning apparatus according to claim 1 wherein:

said air nozzle means comprises an outer vertically moveable nozzle for directing a high velocity air jet against an outer filter surface for dislodging debris therefrom, and an inner vertically moveable nozzle for directing a high velocity air jet against an inner filter surface for dislodging debris therefrom; and said vacuum nozzle means and outer vacuum nozzle moveable along an outer filter surface for drawing in debris dislodged by said outer air nozzle, and an inner vacuum nozzle moveable along an inner filter surface for drawing in debris dislodged by said outer air nozzle.

10. A filter cleaning apparatus according to claim 9 wherein said air nozzle means and said vacuum nozzle means are mounted on a common carriage for vertical movement along said filter.

11. A filter cleaning apparatus according to claim 10 wherein said common carriage is reciprocated by means of a linear air actuated motor connected thereto by means of a chain drive.

12. A filter cleaning apparatus for cleaning tubular filters, comprising:

a support frame;

mounting means on said support frame comprising a vertically oriented clamp having a generally conical lower jaw and a spring mounted upper jaw for supporting a filter in a vertical orientation;

means for rotating said lower jaw for rotating a filter mounted in said mounting means;

means for jolting a filter in said mounting means; and inner cleaning head means for movement along an inner surface of a filter for cleaning said inner surface and outer cleaning head means for movement along an outer surface of a filter for cleaning said outer surface, each of said inner cleaning head means and outer cleaning head means comprising air nozzle means mounted for directing an air jet against a filter surface for dislodging debris therefrom, and vacuum nozzle means for drawing in debris dislodged by said air nozzle means.

13. A filter cleaning apparatus according to claim 12 wherein said means for rotating said filter comprises a reversible drive motor connected by chain drive means for rotating said lower jaw in a first direction, and means for jolting said filter comprises cooperative ramp means for intermittently raising and dropping said lower jaw during rotation thereof in a second direction.

14. A filter cleaning apparatus according to claim 13 wherein said air nozzle means is mounted within and surrounded by said vacuum nozzle means and operable simultaneously therewith for directing an air jet against a filter surface for dislodging debris therefrom while said vacuum nozzle means is drawing in debris dislodged by said air nozzle.

15. A filter cleaning apparatus according to claim 14 wherein said air nozzle means of said inner cleaning head means is retractable into and extendable from said vacuum nozzle means.

16. A filter cleaning apparatus for cleaning tubular filters, comprising:

a support frame having means defining a chamber;

clamping means in said chamber having a generally conical lower jaw and a spring mounted upper jaw for supporting a filter in a vertical orientation;

drive means comprising a reversible drive motor connected by chain drive means for rotating said lower jaw in a first direction, and means for jolting said filter comprising cooperative ramp means for intermittently raising and dropping said lower jaw during rotation thereof in a second direction for selectively rotating and jolting a filter mounted in said clamping means; and inner cleaning head means for movement along an inner surface of a filter for cleaning said inner surface and outer cleaning head means for movement along an outer surface of a filter for cleaning said outer surface, each of said inner cleaning head means and outer cleaning head means comprising air nozzle means mounted for directing an air jet against a filter surface for dislodging debris therefrom, and vacuum nozzle means for drawing in debris dislodged by said air nozzle means.

17. A filter cleaning apparatus according to claim 16 wherein said air nozzle means is mounted within and surrounded by said vacuum nozzle means and operable simultaneously therewith for directing an air jet against a filter surface for dislodging debris therefrom while said vacuum nozzle means is drawing in debris dislodged by said air nozzle.

18. A filter cleaning apparatus according to claim 17 wherein said air nozzle means of said inner cleaning head means is retractable into and extendable from said vacuum nozzle means.

19. A filter cleaning apparatus according to claim 16 wherein:

said air nozzle means comprises an outer vertically moveable nozzle for directing a high velocity air jet against an outer filter surface for dislodging debris therefrom, and an inner vertically moveable nozzle for directing a high velocity air jet against an inner filter surface for dislodging debris therefrom; and said vacuum nozzle means and outer vacuum nozzle moveable along an outer filter surface for drawing in debris dislodged by said outer air nozzle, and an inner vacuum nozzle moveable along an inner filter surface for drawing in debris dislodged by said inner air nozzle.

20. A filter cleaning apparatus according to claim 19 wherein said air nozzle means and said vacuum nozzle means are mounted on a common carriage for vertical movement along said filter;

carriage drive means for reciprocating said common carriage comprising a linear air actuated motor connected thereto by means of a chain drive; and control means for selectively operating said drive means, said air nozzle means, said vacuum nozzle means, and said carriage drive means.

* * * * *